United States Patent
Ito

(10) Patent No.: US 8,023,640 B2
(45) Date of Patent: Sep. 20, 2011

(54) COMMUNICATION APPARATUS CAPABLE OF ADJUSTING VOLUME OF VOICE TO BE REPRODUCED

(75) Inventor: Tomohiro Ito, Mizuho (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1380 days.

(21) Appl. No.: 11/091,562

(22) Filed: Mar. 29, 2005

(65) Prior Publication Data
US 2005/0220281 A1    Oct. 6, 2005

(30) Foreign Application Priority Data
Mar. 31, 2004 (JP) .................. 2004-105128

(51) Int. Cl.
*H04M 1/00* (2006.01)
(52) U.S. Cl. ............ 379/388.04; 379/93.37; 379/100.01
(58) Field of Classification Search . 379/387.01–388.05
See application file for complete search history.

(56) References Cited

U.S. PATENT DOCUMENTS

| | | | |
|---|---|---|---|
| 5,790,656 A | 8/1998 | Rahamim et al. | |
| 5,912,964 A * | 6/1999 | Stelman | 379/390.01 |
| 5,960,442 A * | 9/1999 | Pickering | 707/104.1 |
| 5,999,597 A * | 12/1999 | Brown | 379/93.05 |
| 6,553,118 B1 | 4/2003 | Smith et al. | |
| 6,665,403 B1 | 12/2003 | Fischer et al. | |
| 6,888,938 B2 | 5/2005 | Cui et al. | |
| 7,095,848 B1 | 8/2006 | Fischer et al. | |
| 7,177,417 B2 * | 2/2007 | Michaelis | 379/395 |
| 2003/0048483 A1 * | 3/2003 | Okabe | 358/400 |
| 2004/0125749 A1 * | 7/2004 | Nishizaki | 370/250 |

FOREIGN PATENT DOCUMENTS

| | | |
|---|---|---|
| EP | 0766447 | 4/1997 |
| JP | 59-157374 U | 10/1984 |
| JP | 4-56555 A | 2/1992 |
| JP | 5030328 | 2/1993 |
| JP | 5347661 | 12/1993 |
| JP | 7288604 | 10/1995 |
| JP | 8242279 | 9/1996 |
| JP | 2001-77887 A | 3/2001 |
| JP | 2001-103126 A | 4/2001 |

* cited by examiner

*Primary Examiner* — Fan Tsang
*Assistant Examiner* — Ibraham Sharifzada
(74) *Attorney, Agent, or Firm* — Banner & Witcoff, Ltd.

(57) ABSTRACT

A communication apparatus through which voice communication can be performed, including: a line interface portion which receives and transmits data form and to a line and which includes a data access arrangement device in which is incorporated a detection circuit that detects at least one of a line voltage and a line current; a voice reproducing device which reproduces a voice that is based on voice communication data transmitted from the line to the line interface portion; and a volume adjuster which adjusts reproduction volume with which the voice is to be reproduced by the voice reproducing device, on the basis of a detected value of the detection circuit.

9 Claims, 6 Drawing Sheets

COMMUNICATION APPARATUS CAPABLE OF ADJUSTING VOLUME OF VOICE TO BE REPRODUCED

The present application is based on Japanese Patent Application No. 2004-105128 filed on Mar. 31, 2004, the contents of which are incorporated herein by reference.

BACKGROUND OF THE INVENTION

1. Field of the Invention

The present invention relates in general to a communication apparatus including a line interface portion which receives and transmits data from and to a line and which includes a data access arrangement device in which is incorporated a detection circuit capable of detecting at least one of a line voltage and a line current.

2. Discussion of Related Art

As a communication apparatus, there is conventionally known a telephone set which reproduces, by a telephone receiver thereof, a voice signal transmitted from public switched telephone network (PSTN) via a telephone line. This kind of telephone set suffers from, due to transmission loss, variation in an input level of the voice signal inputted into the telephone receiver depending upon the length of the telephone line connected to an exchanger. Therefore, in the telephone set connected to the telephone line which is relatively long, the reproduction volume of the voice to be reproduced by the telephone receiver is small, so that a user may feel difficulty in hearing the voice during conversation with a communication partner.

To solve the problem indicated above, there is conventionally proposed a technique as disclosed in JP-A-5-347661, for instance. In the disclosed technique, a detection circuit capable of detecting a line current is disposed at a position that is nearer to a line than a line interface portion which transmits a dial signal and which performs control relating to status of closing and connection of the line, and an amplification factor of an amplifier provided on a telephone receiver is adjusted on the basis of a detected value of the detection circuit.

SUMMARY OF THE INVENTION

In the conventional technique described above, however, the detection circuit is provided exclusively for adjusting the amplification factor of the amplifier of the telephone receiver, undesirably pushing up the cost of manufacture of the telephone set.

The present invention has been made in the light of the situations as described above. It is therefore an object of the invention to provide a communication apparatus capable of adjusting the reproduction volume of a telephone receiver without providing a detection circuit exclusively for adjusting the reproduction volume and independently of a line interface portion.

The above-indicated object of the present invention may be achieved according to a principle of the invention, which provides a communication apparatus through which voice communication can be performed, comprising: a line interface portion which receives and transmits data form and to a line and which includes a data access arrangement device in which is incorporated a detection circuit that detects at least one of a line voltage and a line current; a voice reproducing device which reproduces a voice that is based on voice communication data transmitted from the line to the line interface portion; and a volume adjuster which adjusts reproduction volume with which the voice is to be reproduced by the voice reproducing device, on the basis of a detected value of the detection circuit In the communication apparatus constructed according to the present invention, the reproduction volume of the voice reproducing device is adjusted by utilizing the detection circuit which is incorporated in the data access arrangement device. Accordingly, it is not necessary to provide, in the apparatus, a detection circuit for adjusting the reproduction volume, separately from or independently of the line interface portion. Therefore, this arrangement reduces the cost of manufacture and the size of the apparatus.

As the data access arrangement device, there is known one in which is incorporated a detection circuit that detects at least one of a line voltage and a line current for connecting the data access arrangement to the line so as to comply with line standards.

When the line is closed and the communication apparatus is connected to the line, i.e., the line-closing-and-connection is established, the line voltage and the line current are unstable. If the volume adjuster is operated in such an unstable period of the line voltage and the line current, the reproduction volume of the voice reproducing device may be improperly adjusted.

In the light of the above, the communication apparatus of the present invention may be arranged to further comprise: a judging portion which judges, upon closing of the line and connection of the communication apparatus to the line, whether the line voltage and the line current fall within a specified range, on the basis of the detected value of the detection circuit; and an operation controller which operates the volume adjuster where the judging portion judges that the line voltage and the line current fall within the specified range.

In the arrangement described above, the volume adjuster is operated after the unstable period of the line voltage and the line current upon establishment of the line-closing-and-connection has been terminated and the line voltage and the line current have fallen within the specified range. Accordingly, the volume adjuster adjusts the reproduction volume by using the value of the detection circuit detected with the line voltage and the line current being stable after the line-closing-and-connection. Therefore, this arrangement is effective to prevent the reproduction volume from being improperly adjusted by the volume adjuster.

Where the present communication apparatus comprises a line-voltages/current adjuster which adjusts, upon closing of the line and connection of the communication apparatus to the line, the line voltage and the line current so as to fall within the specified range, on the basis of the detected value of the detection circuit, the communication apparatus may be arranged to further comprise an operation controller which operates the volume adjuster upon termination of the adjustment of the line voltage and the line current by the line-voltages/current adjuster. According to this arrangement, the volume adjuster is operated after the line voltage and the line current have fallen within the specified range, whereby the reproduction volume can be prevented from being improperly adjusted as in the above-indicated arrangement in which the communication apparatus comprises the judging portion.

The line-voltages/current adjuster may be arranged to adjust the line voltage and the line current so as to fall within the specified range by adjusting a resistance value of a line-side port of the data access arrangement device.

In the communication apparatus according to the present invention, the volume adjuster may be arranged to adjust, upon operation thereof, the reproduction volume on the basis of the detected value of the detection circuit such that the reproduction volume is increased or decreased, for setting the reproduction volume at an optimum level. In this arrangement, the reproduction volume of the volume reproduction device is adjusted to be increased or decreased, so that the reproduction volume can be kept at the optimum level depending upon the line status.

If the reproduction volume is excessively large at the commencement of the reproduction of the voice, the user may be surprised at the excessively large volume. In view of this, the volume adjuster may be arranged to adjust, on the basis of the detected value of the detection circuit, the reproduction volume of the voice reproducing device such that the reproduction volume is increased, so as to set the reproduction volume at the optimum level.

Where the voice reproducing device is arranged such that the reproduction volume is selectively changed between at least two levels consisting of a large-volume level and a small-volume level and such that the reproduction volume is kept at the small-volume level until the volume adjuster is operated, the volume adjuster may be arranged to judge, upon operation thereof, whether the reproduction volume needs to be changed to the large-volume level, on the basis of the detected value of the detection circuit, and change the reproduction volume to the large-volume level when it is judged that the reproduction volume needs to be changed to the large-volume level. This arrangement eliminates a risk of surprising the user upon reproduction of the voice due to an excessively large reproduction volume.

The volume adjuster according to the arrangement described just above may be arranged to compare the detected value of the detection circuit with a prescribed reference value and judge whether the reproduction volume needs to be changed on the basis of a result of the comparison. This arrangements permits easy and speedy changing of the reproduction volume.

The communication apparatus of the present invention may further comprise: a handset device utilized for performing voice communication; and a modem utilized for performing facsimile communication, so that voice communication and facsimile communication can be performed through the communication apparatus. Where the communication apparatus comprises the handset device and the modem, a primary-side/secondary-side insulation circuit may be provided on a path which connects the modem and the handset device to the data access arrangement device in such a manner that permits transmission and reception of data therebetween, for insulating the modem and the handset device which are on a secondary side, from the line which is on a primary side.

It may be considered that a separate line control portion (network control unit) for voice communication is provided on a path connecting the data access arrangement device of the line interface portion to a telephone line and that a primary-side/secondary-side insulation circuit is provided on a path connecting the data access arrangement to the modem while, at the same time, another primary/secondary side insulation circuit is provided on a path connecting the line control portion to the handset device. Such an arrangement, however, requires provision of a plurality of insulation circuits in the apparatus, undesirably pushing up the cost of its manufacture.

In contrast, where the modem and the handset device are connected to the data access arrangement in a way that permits transmission and reception of data therebetween and the primary-side/secondary-side insulating circuit is provided on the path connecting the modem and the handset to the data access arrangement, for insulating the modem and the handset device which are on the secondary side, from the line side which is on the primary side, only one insulation circuit is needed in the apparatus.

In the communication apparatus arranged to perform voice communication and facsimile communication as described above, the data access arrangement device is arranged to handle voice communication data and facsimile communication data. Accordingly, a converting circuit is provided for converting voice communication data transmitted from the line to the data access arrangement device into a signal that can be processed by the handset device for outputting the converted signal to the handset device and for converting an output signal of the handset device into voice communication data that can be processed by the data access arrangement device.

The converting circuit may be arranged to obtain, via the primary-side/secondary-side insulating circuit, the voice communication data transmitted from the line to the data access arrangement device and to output the voice communication data converted from the output signal of the handset device, to the data access arrangement device via the primary-side/secondary-side insulation circuit.

According to the present invention, where the communication apparatus is arranged such that voice communication and facsimile communication can be performed, the apparatus construction can be simplified and the cost of manufacture of the apparatus can be reduced.

BRIEF DESCRIPTION OF THE DRAWINGS

The above and other objects, features, advantages and technical and industrial significance of the present invention will be better understood by reading the following detailed description of a preferred embodiment of the invention, when considered in connection with the accompanying drawings, in which.

DETAILED DESCRIPTION OF THE PREFERRED EMBODIMENT

Figure 1:
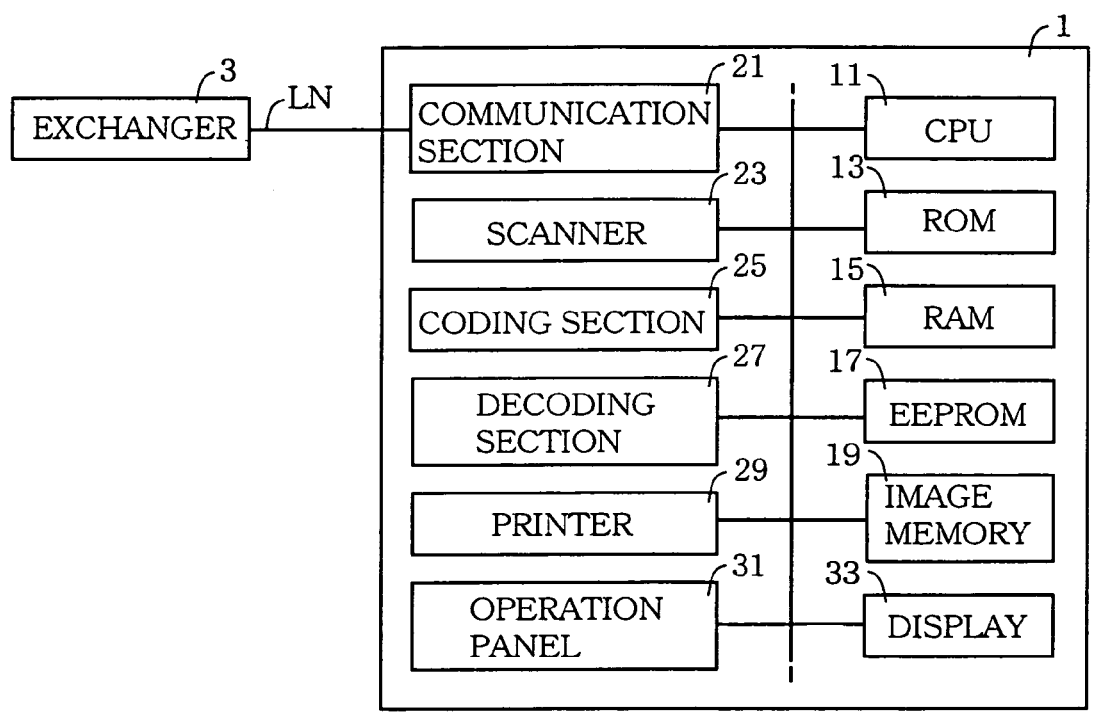
FIG. 1 is a block diagram showing an electric configuration of a facsimile apparatus according to the present embodiment.
Figure 2A:
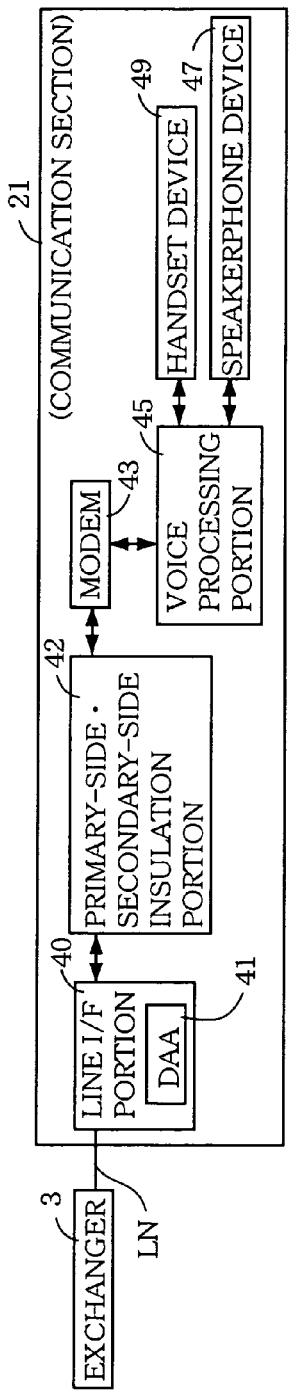
FIG. 2A is a block diagram showing a configuration of a communication section and FIG. 2B is a block diagram showing a configuration of a voice processing portion.
Figure 2B:
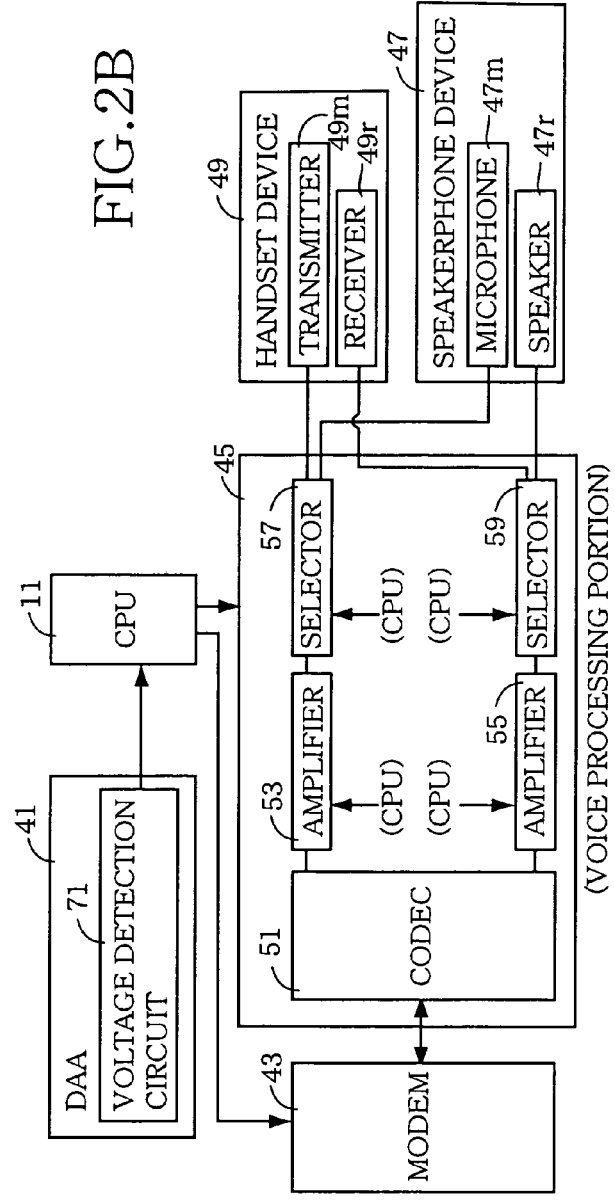
Figure 3:
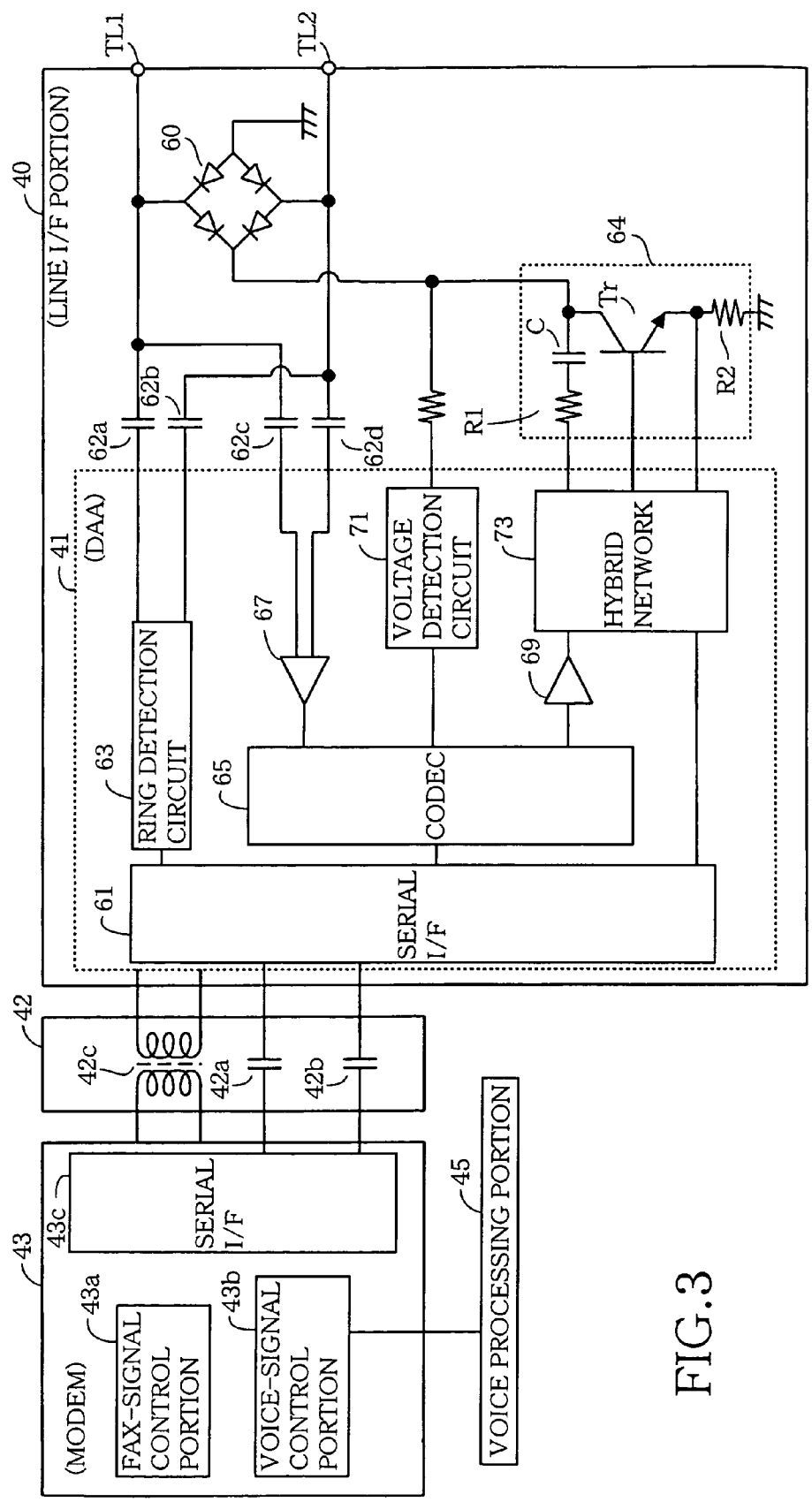
FIG. 3 is a block diagram showing a configuration of a line interface portion.

There will be described one embodiment of the present invention referring to the drawings. FIG. 1 is a block diagram showing an electrical configuration of a facsimile apparatus 1 to which the principle of the present invention is applied and which is one example of a communication apparatus of the present invention. FIG. 2A is a block diagram showing a configuration of a communication section 21 and FIG. 2B is a block diagram showing a configuration of a voice processing portion 45. FIG. 3 is a block diagram showing a configuration of a line interface portion 40.

The facsimile apparatus 1 of the present embodiment includes a CPU 11, a ROM 13, a RAM 15, an EEPROM 17, an image memory 19, the communication section 21, a scanner 23, a coding section 25, a decoding section 27, a printer 29, an operation panel 31, and a display 33, which are connected to one another by a bus line.

The CPU 11 controls each of the sections and components 13-33 connected by the bus line, and establishes, for instance, facsimile communication, voice communication, etc., by controlling the communication section 21. The ROM 13 stores various programs executed by the CPU 11 while the RAM 15 is utilized as a working memory for temporarily storing various data upon execution of various programs by the CPU 11. The EEPROM 17 is utilized as a memory for storing various setting information relating to the facsimile apparatus 1.

The image memory 19 is a memory for storing read data produced by the scanner 23, received data which are received from an external facsimile apparatus, etc. Read data produced by the scanner 23 are stored in the image memory 19. Facsimile data received by the communication section 21 are stored in the image memory 19 after having been converted into decoded data by the decoding section 27 and the stored data are cleared from the image memory 19 after having been printed by the printer 29.

The communication section 21 is utilized for facsimile communication and voice communication, and includes the line interface portion 40, a primary-side/secondary-side insulation portion 42, a modem 43, the voice processing portion 45, a speakerphone device 47, and a handset device 49. (Each component and device will be explained in greater detail.) The scanner 23 optically reads a supplied draft or a manuscript by using an image sensor, for instance, and generates read data based on the outcome by reading.

The coding section 25 codes read data produced by the scanner 23 and produces facsimile data which are image data for facsimile transmission. The decoding section 27 decodes facsimile data transmitted from the external facsimile apparatus and received by the communication section 21. The facsimile data are converted into data whose format can be handled by the printer 29.

The printer 29 prints, on a print sheet, an image which is based on decoded data produced by the decoding section 27 or an image which is based on read data produced by the scanner 23. The printer 29 is an ink-jet printer, for instance. The operation panel 31 is provided with number keys from 0 to 9 and various operation keys. Upon operation of those keys by the user, information indicative of the operation is inputted to the CPU 11. The display 33 is constituted by a liquid crystal display, for instance, and displays various information in accordance with commands from the CPU 11.

There will be next explained the configuration of the communication section 21. The line interface portion 40 of the communication section 21 is a circuit for receiving and transmitting data (such as voice communication signals, facsimile communication signals, etc.) from and to a line side (i.e., a side of an exchanger 3). The line interface portion 40 is constituted by including a semiconductor DAA (data access arrangement) device 41. The present facsimile apparatus 1 is connected to a telephone line LN that is connected to the exchanger 3 of public switched telephone network (PSTN), via the line interface portion 40.

The line interface portion 40 receives various signals transmitted from the public switched telephone network (PSTN), such as ring (call) signals from the exchanger 3 and voice communication signals and the facsimile communication signals transmitted from an external communication terminal equipment, and transmits, to the exchanger 3, communication signals necessary for facsimile communication and voice communication. Analog communication signals transmitted from the telephone line LN to the line interface portion 40 are converted into digital communication signals by a codec 65 of the line interface portion 40, and are outputted to the modem 43 via the primary-side/secondary-side insulation portion 42.

The primary-side/secondary-side insulation portion 42 (hereinafter may be referred to simply as "the insulation portion 42") is provided in the light of safety standards for insulating or separating the line side (primary side) and the modem side (secondary side) from each other. The insulation portion 42 includes condensers 42a, 42b which are disposed on a path that connects the semiconductor DAA device 41 of the line interface portion 40 and the modem 43 to each other in such a manner that permits transmission and reception of data therebetween. The condensers 42a, 42b establish DC insulation between (a) the primary-side line interface portion 40 and (b) the secondary-side modem 43 and devices and components which are disposed downstream of the modem 43 (such as: the voice processing portion 45, the speakerphone device 47, and the handset device 49 of the communication section 21; and various devices and components 11-19, 23-33 of the facsimile apparatus 1 which are connected to the communication section 21 by the bus line). The insulation portion 42 further includes a transformer 42c for supplying, via the modem 43, power to the semiconductor DAA device 41 of the line interface portion 40.

The modem 43 includes a FAX-signal control portion 43a which is operated when facsimile communication is performed, a voice-signal control portion 43b which is operated when voice communication is performed, and a serial interface 43c which connects the FAX-signal control portion 43a and the voice-signal control portion 43b to the line interface portion 40 in such a manner that permits transmission and reception of data therebetween.

The FAX-signal control portion 43a is a signal-converting device for performing facsimile communication with the external facsimile apparatus. The FAX-signal control portion 43a produces a communication signal for facsimile transmission based on facsimile data produced by the coding section 25, outputs the produced facsimile communication signal to the semiconductor DAA device 41 of the line interface portion 40 via the insulating portion 42, and obtains, via the insulating portion 42, a facsimile communication signal transmitted from the line side to the semiconductor DAA device 41 of the line interface portion 40, for extracting facsimile data therefrom. In addition to the conversion operation described above, the FAX-signal control portion 43a transmits and receives various procedure signals for transmission control.

The voice-signal control portion 43b connects the voice processing portion 45 that is connected to the handset device 49 and the semiconductor DAA device 41 of the line interface portion 40 to each other in such a manner that permits transmission and reception of data therebetween, when voice communication is performed. The voice-signal control portion 43b outputs, as a voice communication signal for transmission, a digital voice signal inputted from the voice processing portion 45, to the semiconductor DAA device 41 of the line interface portion 40 via the insulation portion 42. Further, the voice-signal control portion 43b outputs a digital voice communication signal inputted from the line interface portion 40 via the insulating portion 42, as a digital voice signal.

The voice processing portion 45 includes a codec 51: which converts a digital voice signal inputted from the voice-signal control portion 43b into an analog voice signal that can be reproduced by the handset device 49 or the speakerphone device 47 and outputs the analog voice signal to the handset device 49 or the speakerphone device 47; and which converts an analog voice signal inputted from the handset device 49 or the speakerphone device 47 into a digital voice signal that are processed by the voice-signal control portion 43b and the semiconductor DAA device 41 of the line interface portion 40 and outputs the digital voice signal to the voice-signal control portion 43b of the modem 43.

The sound processing portion 45 includes: an amplifier 53 which amplifies an analog voice signal inputted from the handset device 49 or the speakerphone device 47 and outputs the amplified analog voice signal to the codec 51; an amplifier 55 which amplifies an analog voice signal inputted from the codec 51; a selector 57 which selectively outputs an analog voice signal inputted from either one of the handset device 49 and the speakerphone device 47 to the voice-signal control portion 43b of the modem 43 via the amplifier 53 and the codec 51; and a selector 59 which outputs an analog voice signal outputted from the codec 51 and amplified by the amplifier 55, to either one of the handset device 49 and the speakerphone device 47.

The amplifiers 53, 55 are arranged such that each gain (signal amplification factor) thereof can be changed in two steps consisting of a "LOW" level and a "HIGH" level (LOW/HIGH) and performs gain adjustment (for adjusting the gain to the "LOW" level or the "HIGH" level) upon reception of commands from the CPU 11. The selectors 57, 59 are controlled by the CPU 11 so as to be connected to one of the handset device 49 and the speakerphone device 47.

The handset device 49 used when voice communication is performed is a known handset device including a transmitter 49m constituted by a microphone and a receiver 49r constituted by a speaker. The speakerphone device 47 permits hand-free communication and includes a speaker 47r and a microphone 47m. At the receiver 49r and the speaker 47r, a voice which is based on a voice communication signal transmitted from the line side to the line interface portion 40 is reproduced, on the basis of an output signal from the selector 59.

Next, there will be explained in detail the configuration of the line interface portion 40. The line interface portion 40 according to the present embodiment includes, in addition to the semiconductor DAA device 41, a diode bridge 60 for rectifying polarity of a DC loop current of the line network in one direction, loop cut condensers 62a, 62b, 62c, 62d, an adjustment circuit 64 for adjusting a resistance value of a line-side end port of the semiconductor DAA device 41, etc. To the line interface portion 40, a two-wire telephone line LN is connected via terminals TL1, TL2.

The semiconductor DAA device 41 of the line interface portion 40 includes: a serial interface 61 that is connected to the serial interface 43c of the modem 43 via the insulation portion 42; a ring detection circuit 63; the codec 65; a reception amplifier 67; a transmission amplifier 69, a voltage detection circuit 71; and a hybrid network 73.

The ring detection circuit 63 is connected to the telephone line LN via the terminals TL1, TL2. The ring detection circuit 63 detects a ring signal upon arrival thereof from the telephone line LN and outputs, to the serial interface 61, a ring detection signal which changes at the same cycle as the ring signal. A ring detection signal inputted to the serial interface 61 is outputted to the modem 43 via a transmission path in which is interposed the condenser 42b of the insulation portion 42. When a ring detection signal is inputted to the modem 43, the modem 43 notifies the CPU 11 of the input of the ring detection signal.

The codec 65 includes an analog-to-digital conversion circuit and a digital-to-analog conversion circuit. After the line has been closed and connected to the facsimile apparatus 1 (i.e., line-closing-and-connection has been established), the codec 65 converts an analog communication signal (a voice communication signal or a facsimile communication signal) received from the line side (the public switched telephone network) via the telephone line LN, into a digital communication signal, and outputs the digital communication signal to the modem 43 via the serial interface 61. Further, the codec 65 converts a digital communication signal (a voice communication signal or a facsimile communication signal) inputted from the modem side, into an analog communication signal, and outputs the analog communication signal to the telephone line LN side.

The codec 65 is connected to the telephone line LN via the reception amplifier 67 and to the hybrid network via the transmission amplifier 69. Further, the codec 65 is connected to an output end of the voltage detection circuit 71 so as to convert a detection signal of the voltage detection circuit 71 into a digital signal and output the digital signal to the modem side. When a detection signal of the voltage detection circuit 71 is inputted to the modem 43, the modem 43 outputs the inputted detection signal to the CPU 11.

The reception amplifier 67 is a differential amplifier, and outputs an analog communication signal inputted from the terminals TL1, TL2 that are connected to the telephone line LN, to the codec 65 in a differential input method. The transmission amplifier 69 is arranged to amplify an analog communication signal outputted from the codec 65 and input the amplified analog communication signal to the hybrid network 73.

The voltage detection circuit 71 detects a line voltage which is applied to the semiconductor DAA device 41 after having been rectified by the diode bridge 60 and is connected to a path which connects the diode bridge 60 and the hybrid network 73 to each other. A detection signal of the voltage detection circuit 71 (indicative of a voltage value) is outputted to the codec 65, and then to the CPU 11 from the codec 65 via the modem 43.

The hybrid network 73 transmits, to the telephone line LN, a communication signal for transmission (a facsimile communication signal or a voice communication signal) outputted from the codec 65 via the transmission amplifier 69. In order to form a closed loop which complies with the line standards, the hybrid network 73 adjusts a resistance value of a line-side end thereof by operation of the adjustment circuit 64 which is disposed on a path connecting the hybrid network 73 and the telephone line LN, thereby adjusting the line voltage and a line current. The line-port end of the hybrid network 73 is the line-side port of the semiconductor DAA device 41.

The adjustment circuit 64 includes: a transistor Tr whose collector is connected to the diode bridge 60; a condenser C and a resistance R1 which are disposed on a path connecting the collector of the transistor Tr and the hybrid network 73; and a resistance R2 which is disposed on a path connecting an emitter of the transistor Tr and the ground.

The hybrid network 73 is connected to a base and the emitter of the transistor Tr and forms the closed loop upon turning on the transistor Tr, thereby closing the line. The hybrid network 73 adjusts a base potential to be applied to the transistor Tr, and thereby adjusts the resistance value of the line-side end of the hybrid network 73, so as to permit the line voltage and the line current to comply with the line standards. The hybrid network 73 is also connected to the serial interface 61 and controlled by the CPU 11 via the serial interface 61 and the modem 43.

The serial interface 61 described above unifies a ring detection signal from the ring detection circuit 63, a digital communication signal outputted from the codec 65, etc., into serial signals, and output the serial signals to a transmission path in which is interposed the condenser 42*a*. Further, the serial interface 61 separates each of serial signals inputted from the modem 43 via the transmission path in which is interposed the condenser 42*b* and outputs the separated serial signals to each portion or device of the semiconductor DAA device 41.

Figure 4:
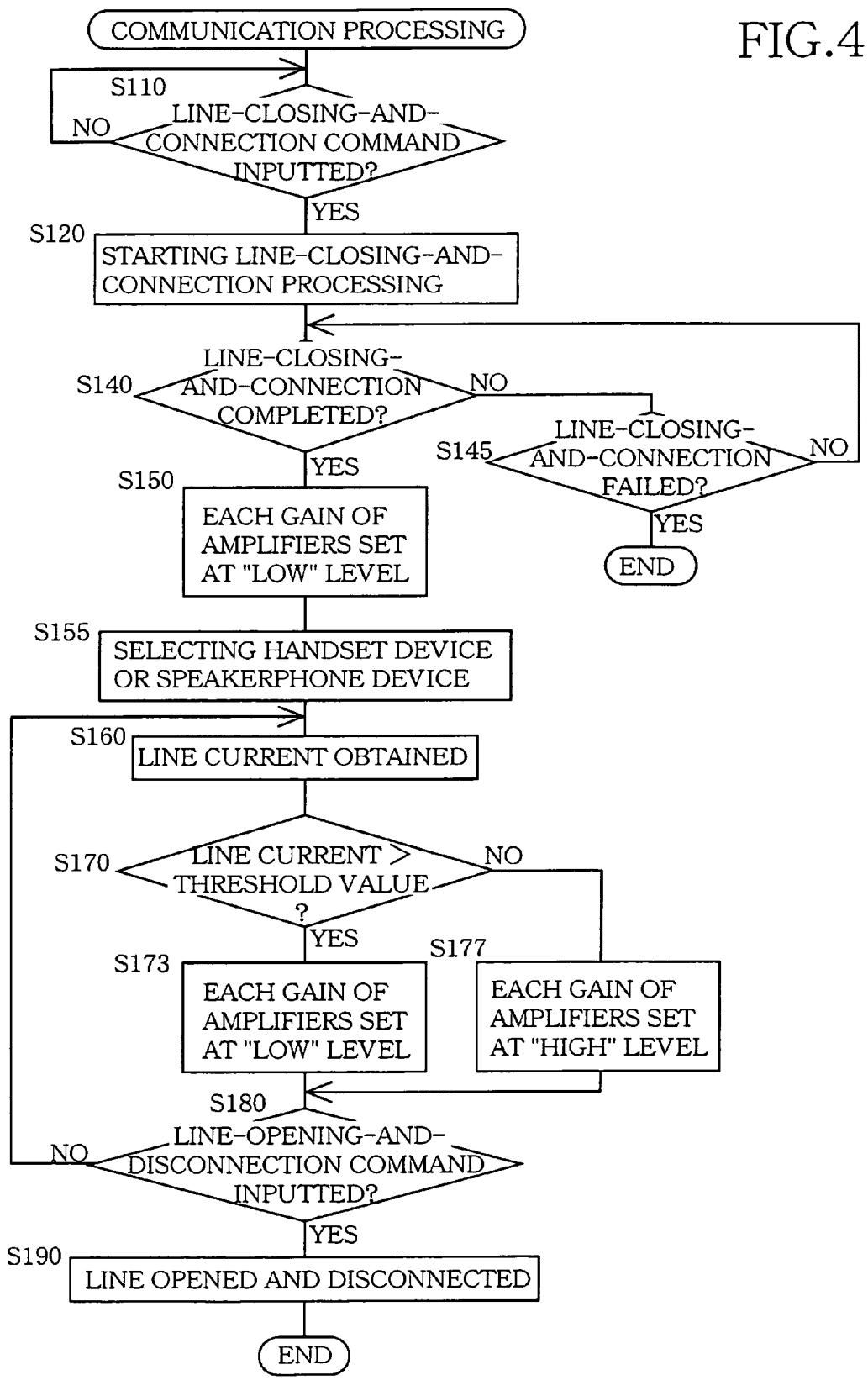
FIG. 4 is a flowchart showing communication processing executed by a CPU.

There will be next explained communication processing executed by the CPU of the facsimile apparatus 1. FIG. 4 is a flow chart showing the communication processing executed by the CPU 11 and FIG. 5 is a flow chart showing line-closing-and-connection processing executed by the CPU 11.

When the communication processing is executed, Step S110 (hereinafter "Step" is omitted if appropriate) is initially implemented in which the CPU 11 waits until a line-closing-and-connection command is inputted when the handset device 49 is placed in an off-hook state by the user or when an off-hook key provided on the operation panel 31 is pushed by the user. Where it is judged at S110 that the line-closing-and-connection command has been inputted ("YES" at S110), a line-closing-and-connection processing task is started at S120, and the control flow then goes to S140.

Figure 5:
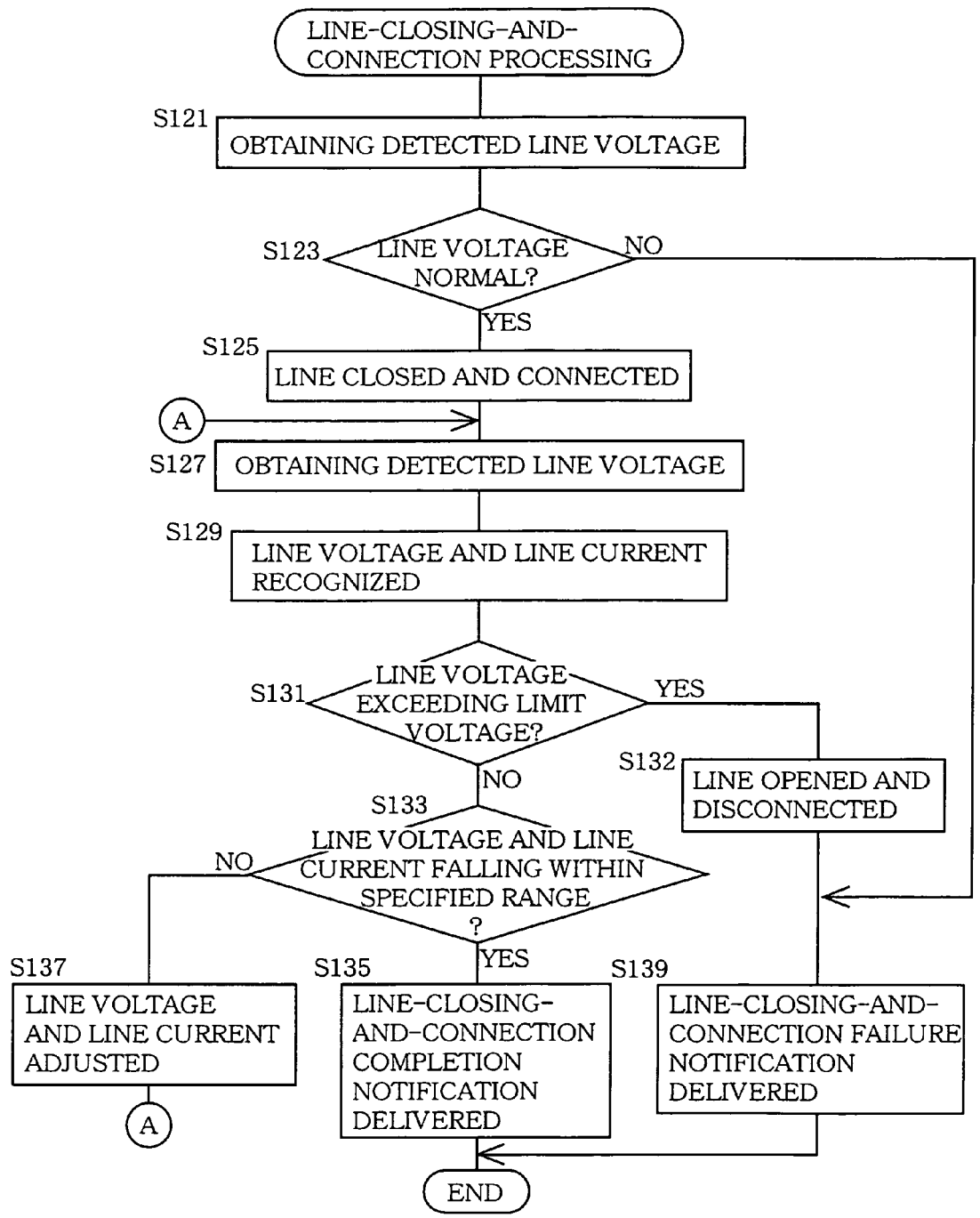
FIG. 5 is a flowchart showing line-closing-and-connection processing executed by the CPU.

In the line-closing-and-connection processing shown in the flow chart of FIG. 5, the CPU 11 obtains a value detected by the voltage detection circuit 71 which is incorporated in the semiconductor DAA device 41 (S121), and judges whether the line voltage indicated by the detected value falls within a normal or appropriate range (S123). This step (S123) is for detecting abnormality of the voltage which results from improper connection of the telephone line LN to the line interface portion 40, for instance.

If it is judged at S123 that the line voltage is not normal ("NO" at S123), the CPU 11 delivers, at S139, line-closing-and-connection failure notification which indicates that the line-closing-and-connection has not been established, to a communication processing task, terminating the line-closing-and-connection processing.

On the other hand, if the line voltage is judged to be normal at S123 ("YES" at S123), the CPU 11 controls the semiconductor DAA device 41 to perform line-closing-and-connection operation (S125). More specifically described, the CPU 11 controls the hybrid network 73 to apply the base potential to the transistor Tr of the adjustment circuit 64, thereby turning on the transistor Tr to form the closed loop with the exchanger 3.

Thereafter, the CPU 11 obtains a value detected by the voltage detection circuit 71 (S127). Further, the CPU 11 calculates a line current on the basis of the detected value of the voltage detection circuit 71 and recognizes the line voltage and the line current (S129).

After the processing at S129 is terminated, the CPU judges whether the line voltage is higher than a predetermined limit voltage (S131). Where it is judged at S131 that the line voltage is higher than the limit voltage ("YES" at S131), the CPU 11 controls the semiconductor DAA device 41 to perform line-opening-and-disconnection operation (S132). Thereafter, the CPU 11 delivers the line-closing-and-connection failure notification to the communication processing task (S139), terminating the line-closing-and-connection processing.

On the other hand, where the line voltage is judged to be not higher than the limit voltage at S131 ("NO" at S131), the CPU 11 judges, on the basis of the processing result at S129, whether the line voltage and the line current fall within a specified range (S133). If the line voltage and the line current are judged to fall within the specified range at S133 ("YES" at S133), the CPU 11 delivers, to the communication processing task, line-closing-and-connection completion notification which indicates that the line-closing-and-connection is completed (S135).

Figure 6:
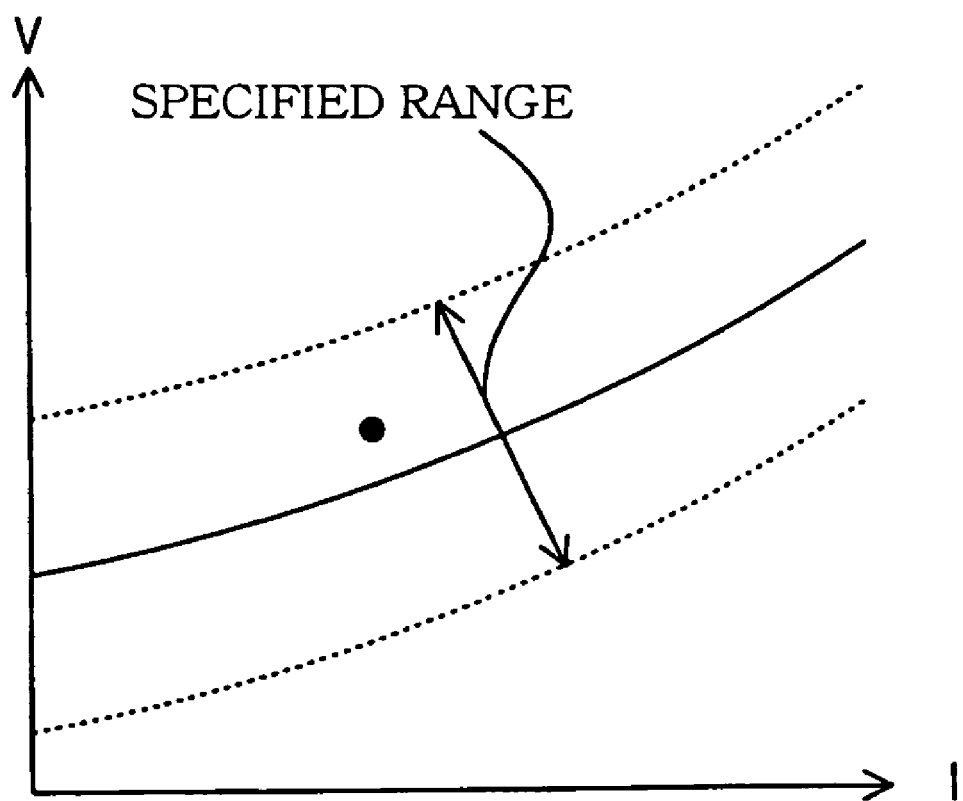
FIG. 6 is a graph showing relationship between (a) line voltage and line current and (b) line standards.

FIG. 6 is a graph showing relationship between (a) line voltage and line current and (b) line standards. Where the line voltage and the line current fall within the specified range indicated in the graph of FIG. 6, the CPU 11 makes an affirmative judgment ("YES") at S133, and terminates the line-closing-and-connection processing after the processing at S135 has been implemented.

Where the CPU judges that the line voltage and the line current do not fall within the specified range at S133 ("NO" at S133), the CPU 11 controls the hybrid network 73 to adjust the base potential of the transistor Tr of the adjustment circuit 64 such that the line voltage and the line current fall within the specified range (S137), and the control flow then goes to S127. For instance, where the line current is under the specified range, the line current is adjusted so as to be increased by increasing the base potential of the transistor Tr, i.e., by increasing the amount of current flowing through the transistor Tr. Where the line current is over the specified range, on the other hand, the line current is adjusted so as to be decreased by decreasing the base potential of the transistor Tr, i.e., by decreasing the amount of current flowing through the transistor Tr.

The adjustment of the base potential at S137 is repeated until the line voltage and the line current are judged to fall within the specified range at S133. Where the line voltage and the line current fall within the specified range, the CPU 11 makes an affirmative judgment ("YES") at S133, and delivers the line-closing-and-connection completion notification to the communication processing task (S135), terminating the line-closing-and-connection processing.

In the meantime, the CPU 11 judges, at S140 of the communication processing, whether the line-closing-and-connection completion notification is delivered from the line-closing-and-connection processing task. If the CPU 11 judges that the line-closing-and-connection completion notification has not been inputted ("NO" at S140), the CPU 11 judges whether the line-closing-and-connection failure notification is delivered (S145). If the CPU 11 judges that the line-closing-and-connection failure notification has not been delivered ("NO" at S145), the CPU 11 waits until the line-closing-and-connection completion notification or the line-closing-and-connection failure notification is delivered from the line-closing-and-connection processing task. If the CPU 11 judges that the line-closing-and-connection failure notification is delivered ("YES" at S145), the communication processing is terminated.

Where the CPU 11 judges that the line-closing-and-connection completion notification is delivered ("YES" at S140), the CPU 11 sets each gain of the amplifiers 53, 55 of the voice processing portion 45 at the "LOW" level (S150), and connects the amplifiers 53, 55 to one of the handset device 49 and the speakerphone device 47 (S155). By implementing this step (S155), the handset device 49 or the speakerphone device 47 is connected to the voice-signal control portion 43*b* of the modem 43 and accordingly to the semiconductor DAA device 41 in such a manner which enables transmission and reception of data (voice signals) therebetween while a reproduction volume with which a voice is to be reproduced by the handset device 49 or the speakerphone device 47 is made at a small-volume level.

In a case where the line-closing-and-connection command is judged to be inputted at S110 as a result of placing the handset device 49 in the off-hook state, the CPU 11 controls, at S155, the selectors 57, 59 to connect the amplifiers 53, 55 to the handset device 49. In a case where the line-closing-and-connection command is judged to be inputted at S110 as a result of pushing the off-hook key provided on the operation panel 31, the CPU 11 controls, at S155, the selectors 57, 59 to connect the amplifiers 53, 55 to the speakerphone device 47.

After the voice-control portion 45 and one of the handset device 49 and the speakerphone device 47 have been connected to each other, the CPU 11 checks the line current (S160). At this step S160, the CPU 11 obtains a value detected by the voltage detection circuit 71 and indicative of the line voltage, and obtains the line current by calculation on the basis of the detected value.

Subsequently, the CPU 11 judges whether the obtained line current is higher than a threshold or reference value (S170). Where the line current is judged to be higher than the threshold value at S170 ("YES" at S170), the CPU 11 controls the amplifiers 53, 55 such that each gain of the amplifiers 53, 55 is set at the "LOW" level (S173). On the other hand, where the line current is judged to be not higher than the threshold value at S170 ("'NO" at S170), the CPU 11 controls the amplifiers 53, 55 such that each gain of the same 53, 55 is set at the "HIGH" level (S177).

After the processing at S172 or S177, the CPU 11 judges whether a line-opening-and-disconnection command is inputted (S180). Where it is judged by the CPU 11 that the line-opening-and-disconnection command is not inputted ("NO" at S180), the CPU 11 again implements S160 through S173 or S177 to again adjust each gain of the amplifiers 53, 55 on the basis of the line current obtained again in S160. The CPU 11 judges at S180 that the line-opening-and-disconnection command is inputted when the handset device 49 is placed in an on-hook state or when an on-hook key provided on the operation panel 31 is pushed. Where it is judged at S180 that the line-opening-and-disconnection command is inputted ("YES" at S180), the CPU 11 controls the semiconductor DAA device 41 to open the line and disconnect the facsimile apparatus 1 from the line (S190), terminating the communication processing.

In the present facsimile apparatus 1, the line interface portion 40 for transmitting and receiving data (communication signals) to and from the line side includes the semiconductor DAA device 41 in which is incorporated the voltage detection circuit 71 capable of detecting the line voltage. In the thus constructed facsimile apparatus 1, when the handset device 49 is placed in the off-hook state and the line-closing-and-connection command is inputted, the CPU 11 controls the hybrid network 73 to close the line and connect the facsimile apparatus 1 to the line, i.e., to establish the line-closing-and-connection (at S125). Upon establishment of the line-closing-and-connection, the base potential to be applied to the transistor Tr of the adjustment circuit 64 is changed on the basis of the detected value of the voltage detection circuit 71 for adjusting the resistance value of the line-side end of the hybrid network 73, whereby the line voltage and the line current fall within the specified range.

When the adjustment of the resistance value described above is completed and the line voltage and the line current fall within the specified range, the CPU 11 judges that the line voltage and the line current fall within the specified range and then carries out consequent volume-adjustment processing (S160 through S180). Namely, each gain of the amplifiers 53, 55 of the voice processing portion 45 is adjusted on the basis of the line current obtained from the detected value of the voltage detection circuit 71, and the volume of the voice to be reproduced by the receiver 49r of the handset device 49 or the speaker 47r of the speakerphone device 47 (the reproduction volume) is set at a level suitable to the line current. Described more specifically, the line current obtained from the detected value of the voltage detection circuit 71 is compared with the threshold value (the reference value), and each gain of the amplifiers 53, 55 of the voice processing portion 45 is changed to the "LOW" level or the "HIGH" level on the basis of the result of comparison, so that the reproduction volume is changed between the two levels, i.e., the large-volume level and the small-volume level.

When the volume-adjustment processing described above is initially implemented, it is judged that each gain of the amplifiers 53, 55 needs to be changed if the line current is not higher than the threshold value ("NO" at S170). In this instance, by changing each gain of the amplifiers 53, 55 from the "LOW" level to the "HIGH" level, the reproduction volume of the receiver 49r or the speaker 47r is changed so as to be increased, that is, the reproduction volume is changed from the small-volume level to the large-volume level. Where the line current is higher than the threshold value, on the other hand, each gain of the amplifiers 53, 55 is kept at the "LOW" level and therefore the reproduction volume is kept at the small-volume level (S173) until the volume-adjustment processing (S160 through S180) is carried out after the voice outputting has been ready, i.e., after the voice-reproducing preparation has been completed (S155).

In the present embodiment wherein the reproduction volume of the receiver 49r and the speaker 47r is adjusted by utilizing the voltage detection circuit 71 which is incorporated or integrated in the semiconductor DAA device 41, it is not necessary to provide, separately from the line interface portion 40, a detection circuit for the reproduction-volume adjustment, resulting in reduction in the cost of manufacture and the size of the facsimile apparatus 1.

In the facsimile apparatus 1 of the illustrated embodiment, the line current is estimated on the basis of the detected line voltage and each gain of the amplifiers 53, 55 is set so as to correspond to the estimated line current after an unstable period of the line voltage and the line current upon establishment of the line-closing-and-connection has been terminated and the line voltage and the line current have fallen within the specified range. This arrangement prevents improper adjustment of the reproduction volume during the unstable period of the line voltage and the line current.

In the facsimile apparatus 1, each gain of the amplifiers 53, 55 is set at the "LOW" level for minimizing the reproduction volume at the time of commencement of the voice outputting after the connection of the selectors 57, 59 to one of the handset device 49 or the speaker device 47 has been completed, and the reproduction volume is kept at the small-volume level until the volume-adjustment processing (S160 through S180) is initiated. Thereafter, when it is judged that the line current is not higher than the threshold value, each gain of the amplifiers 53, 55 is adjusted such that the reproduction volume is increased. Thus, this arrangement is effective to avoid dissatisfaction of the user which arises from an excessively large reproduction volume at the time of commencement of the voice outputting.

In the illustrated embodiment, each gain of the amplifiers 53, 55 is arranged to be changed between the two levels so as to enable the reproduction volume to be changed between the two volume levels, and the reproduction volume is arranged to be changed on the basis of the result of comparison between the line current obtained from the detected value of the voltage detection circuit 71 and the threshold value. This arrangement realizes speedy and proper adjustment of the reproduction volume with the simple apparatus structure, permitting manufacture of the satisfactory apparatus at a relatively low cost.

In the facsimile apparatus 1 according to the illustrated embodiment, the primary-side/secondary-side insulation portion 42 is provided on the transmission path connecting the semiconductor DAA device 41 and the modem 43 to each other in a way which permits transmission and reception of data therebetween. Further, the handset device 49 is connected to the modem 43 via the voice processing portion 45. Accordingly, it is not required to dispose a plurality of insulation portions on the transmission path of voice communication signals and the transmission path of facsimile communication signals, respectively. In other words, the primary side and the secondary side can be connected while being insulated by the single insulation portion 42. Hence, the facsimile apparatus 1 of the illustrated embodiment can be manufactured at a relatively low cost.

The volume adjuster of the present invention is realized by the processing at S160-S180 executed by the CPU 11 while the judging portion is realized by the processing at S133 executed by the CPU 11. The operation controller is realized by the operation of the CPU 11 to execute the processing at S160 and the following steps upon judgment of the CPU at S140 that the line-closing-and-connection has been completed. The line-voltage/current adjuster is realized by the line-closing-and-connection processing executed by the CPU 11, the operation of the hybrid network 73 based on the line-closing-and-connection processing, and the operation of the adjustment circuit 64. In the illustrated embodiment, the voice reproducing device is constituted by the voice processing portion 45 and the handset device 49 or the speakerphone device 47. The converting circuit corresponds to the codec 51 of the voice processing portion 45.

It is to be understood that the present invention may be embodied with various changes and modifications, which may occur to those skilled in the art, without departing from the spirit and scope of the invention.

In the illustrated embodiment, each gain of the amplifiers 53, 55 is adjusted by using the semiconductor DAA device 41 in which is incorporated the voltage detection circuit 71 which is capable of detecting the line voltage. Each gain of the amplifiers 53, 55 may be adjusted by using a semiconductor DAA device in which is incorporated a current detection circuit which is capable of detecting the line current. By considering the circuit configuration, the line current can be accurately estimated from the detected voltage, and the line voltage can be accurately estimated from the detected current, so that the adjustment of each gain of the amplifiers 53, 55 on the basis of the line current can be properly performed where either one of the voltage detection circuit and the current detection circuit is incorporated in the semiconductor DAA device.

While each gain of the amplifiers 53, 55 is changed between the two levels in the illustrated embodiment, each gain of the amplifiers 53, 55 may be adjusted among a plurality of levels (more than two levels). In this instance, the reproduction volume may be adjusted to be increased by adjusting the gain in steps from a smaller level to a higher level.

What is claimed is:

1. A communication apparatus through which voice communication can be performed, comprising:
    a line interface portion which receives and transmits data from and to an exchanger through a line that is connected to the exchanger and that allows bidirectional communication between the exchanger and the line interface portion and which includes a data access arrangement device having a detection circuit that detects at least one of a line voltage and a line current;
    a voice reproducing device which reproduces a voice that is based on voice communication data transmitted from the line to the line interface portion;
    a volume adjuster which adjusts reproduction volume with which the voice is to be reproduced by the voice reproducing device, on the basis of a detected value of the detection circuit;
    an adjuster which adjusts, upon closing of the line and connection of the communication apparatus to the line, the line voltage and the line current so as to fall within the specified range, on the basis of the detected value of the detection circuit; and
    an operation controller which operates the volume adjuster upon termination of the adjustment of the line voltage and the line current by the adjuster and which does not operate the volume adjuster until the termination of the adjustment of the line voltage and the line current by the adjuster.

2. The communication apparatus according to claim 1, wherein the data access arrangement device is a semiconductor data access arrangement device.

3. The communication apparatus according to claim 1, further comprising:
    a judging portion which judges, upon closing of the line and connection of the communication apparatus to the line, whether the line voltage and the line current fall within a specified range, on the basis of the detected value of the detection circuit; and
    an operation controller which operates the volume adjuster where the judging portion judges that the line voltage and the line current fall within the specified range.

4. The communication apparatus according to claim 1, wherein the adjuster adjusts the line voltage and the line current so as to fall within the specified range by adjusting a resistance value of a line-side port of the data access arrangement device.

5. The communication apparatus according to claim 1, wherein the volume adjuster adjusts, upon operation thereof, the reproduction volume on the basis of the detected value of the detection circuit such that the reproduction volume is increased or decreased.

6. The communication apparatus according to claim 1,
    wherein the voice reproducing device is arranged such that the reproduction volume is selectively changed between at least two levels including a large-volume level and a small-volume level and such that the reproduction volume is kept at the small-volume level until the volume adjuster is operated, and
    wherein the volume adjuster judges, upon operation thereof, whether the reproduction volume needs to be changed to the large-volume level, on the basis of the detected value of the detection circuit, and changes the reproduction volume to the large-volume level when it is judged that the reproduction volume needs to be changed to the large-volume level.

7. The communication apparatus according to claim 6, wherein the volume adjuster compares the detected value of the detection circuit with a prescribed reference value and judges whether the reproduction volume needs to be changed, on the basis of a result of the comparison.

8. The communication apparatus according to claim 1, further comprising: a handset device utilized for performing voice communication; and a modem utilized for performing facsimile communication, to allow voice communication and facsimile communication to be performed through the communication apparatus, wherein an insulation circuit is provided on a path which connects the modem and the handset device to the data access arrangement device in such a manner that permits transmission and reception of data therebetween, for insulating the modem and the handset device which are on a secondary side, from the line which is on a primary side.

9. The communication apparatus according to claim 8, further comprising a converting circuit which converts voice communication data transmitted from the line to the data access arrangement device into a signal that is configured to be processed by the handset device for outputting the converted signal to the handset device and which converts an output signal of the handset device into voice communication data that is configured to be processed by the data access arrangement device, wherein the converting circuit is arranged to obtain, via the insulation circuit, the voice communication data transmitted from the line to the data access arrangement and to output the voice communication data converted from the output signal of the handset device to the data access arrangement device via the insulation circuit.

* * * * *